UNITED STATES PATENT OFFICE.

THOMAS A. EDISON, OF LLEWELLYN PARK, ORANGE, NEW JERSEY, ASSIGNOR TO NORTH JERSEY PAINT COMPANY, OF STEWARTSVILLE, NEW JERSEY, A CORPORATION OF NEW JERSEY.

WATERPROOFING-PAINT FOR PORTLAND-CEMENT BUILDINGS.

No. 909,167.  Specification of Letters Patent.  Patented Jan. 12, 1909.

Application filed February 6, 1908. Serial No. 414,575.

*To all whom it may concern:*

Be it known that I, THOMAS A. EDISON, a citizen of the United States, residing at Llewellyn Park, Orange, county of Essex, and State of New Jersey, have invented certain new and useful Waterproofing-Paint for Portland-Cement Buildings, of which the following is a description.

The object of my invention is to provide a paint for application to dwellings or other buildings constructed of Portland cement, which will be entirely waterproof, and which will actually penetrate the pores of the cement surface, even when monolithic, so that the paint will be very permanent.

I have discovered that a very desirable material for this purpose is that known in the petroleum trade as "B. S.," such material being apparently a very heavy hydrocarbon that settles when crude petroleum is stored for some time in large tanks. This material does not appear to be soluble to any extent in petroleum, and under ordinary conditions is probably held in suspension therein, but when it is permitted to remain quiescent for a considerable time it settles out. "B. S.," so-called, I find by investigation, does not undergo any change when exposed to light, moisture, or other atmospheric conditions; besides which it is a material that is extremely cheap. I take a sufficient quantity of the material and dissolve it in a suitable solvent, such as benzol, petroleum benzine or turpentine, in which a large part of the material is soluble. When used in this condition, as a waterproofing paint, the solution is applied to the cement walls with a brush or otherwise, and the solvent carries the material some distance below the surface of the slightly porous cement, even in monolithic constructions. The solvent quickly evaporates and leaves the "B. S." in the pores and covering the exposed surface. In this condition, the material when so applied is somewhat sticky, and when this stickiness is undesirable, as of course, would be the case for the interior of a house, I add to the solution a sufficient quantity of strongly boiled linseed oil, which is also soluble in the solvent used. Upon the evaporation of the solvent, the linseed oil in a short time oxidizes so as to neutralize the sticky properties of the "B. S." paint, without destroying its waterproofing and other desirable qualities.

It will, of course, be understood that various pigments and oil colors may be added to the solution in order to secure various tints. The color produced by the use of "B. S." without the addition of other pigments is a light yellow tint.

For the treatment of a roof of a cement house, instead of applying the "B. S." in the form of a solution, it may be applied directly by melting it to a thin liquid and applying it hot to the surface of a cement roof. In the latter case, the natural stickiness of the material can be neutralized by applying over the same a fine powder, such as chalk or finely ground clay.

Having now described my invention, what I claim as new and desire to secure by Letters Patent is as follows:—

1. A waterproofing paint for cement structures, comprising a petroleum residue known as "B. S." dissolved in a suitable solvent, substantially as set forth.

2. A waterproof paint for cement structures, comprising a petroleum residue, known as "B. S." dissolved in a suitable solvent, and an additional ingredient to neutralize stickiness, substantially as set forth.

3. A waterproof paint for cement structures, comprising a petroleum residue known as "B. S." dissolved in a suitable solvent, and boiled linseed oil also dissolved in a solvent, substantially as set forth.

4. A waterproof paint for cement structures, comprising a petroleum residue known as "B. S." dissolved in a suitable solvent and a colored pigment, substantially as set forth.

5. A waterproofing paint for cement structures comprising a petroleum residue known as "B. S.," dissolved in a suitable solvent, an additional ingredient to neutralize the stickiness, and a colored pigment, substantially as set forth.

6. A waterproofing paint comprising a petroleum residue known as "B. S." dissolved in a suitable solvent, and an additional oxidizable substance, substantially as set forth.

This specification signed and witnessed this 4th day of Feby 1908.

THOS. A. EDISON.

Witnesses:
ANNA R. KLEHM,
FRANK L. DYER.